(12) United States Patent
Akkiraju et al.

(10) Patent No.: US 10,474,967 B2
(45) Date of Patent: Nov. 12, 2019

(54) CONVERSATION UTTERANCE LABELING

(71) Applicant: International Business Machines Corporation, Armonk, NY (US)

(72) Inventors: Rama Kalyani T. Akkiraju, Cupertino, CA (US); Vibha S. Sinha, Santa Clara, CA (US); Anbang Xu, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 311 days.

(21) Appl. No.: 15/603,091

(22) Filed: May 23, 2017

(65) Prior Publication Data

US 2018/0341632 A1    Nov. 29, 2018

(51) Int. Cl.

| | |
|---|---|
| *G06F 17/24* | (2006.01) |
| *G06F 17/27* | (2006.01) |
| *H04M 3/493* | (2006.01) |
| *H04M 3/51* | (2006.01) |
| *G06N 99/00* | (2019.01) |
| *G06N 7/00* | (2006.01) |
| *G06N 20/00* | (2019.01) |
| *G06F 16/35* | (2019.01) |
| *G06F 16/332* | (2019.01) |
| *G06N 5/02* | (2006.01) |

(52) U.S. Cl.
CPC ......... *G06N 20/00* (2019.01); *G06F 16/3329* (2019.01); *G06F 16/35* (2019.01); *G06F 17/2785* (2013.01); *G06N 5/022* (2013.01); *G06N 7/005* (2013.01); *H04M 3/4936* (2013.01); *H04M 3/5166* (2013.01); *H04M 2201/40* (2013.01); *H04M 2203/552* (2013.01)

(58) Field of Classification Search
CPC .... G06N 20/00; G06N 7/005; G06F 16/3329; G06F 16/35; G06F 17/2785; H04M 3/5166; H04M 3/4936; H04M 2203/552; H04M 2201/40
USPC .......................................................... 704/9
See application file for complete search history.

(56) References Cited

U.S. PATENT DOCUMENTS

| | | | |
|---|---|---|---|
| 7,092,888 B1 * | 8/2006 | McCarthy ............. | G10L 15/063 379/88.01 |
| 7,711,566 B1 * | 5/2010 | Begeja .................... | G10L 15/18 704/270 |
| 7,949,525 B2 * | 5/2011 | Hakkani-Tur ...... | G10L 15/1822 704/231 |
| 8,515,736 B1 * | 8/2013 | Duta ................... | G10L 15/1822 704/9 |

(Continued)

FOREIGN PATENT DOCUMENTS

EP    1696421 A2    8/2006

OTHER PUBLICATIONS

Tur et al, "Semi-supervised learning for spoken language understanding using semantic role labeling", IEEE, 2005, pp. 232-237.

(Continued)

*Primary Examiner* — Edwin S Leland, III
(74) *Attorney, Agent, or Firm* — Levine's Tech Consulting LLC; Frank E. Levine

(57) ABSTRACT

A method, a computer program product, and an information handling system is provided for labeling unlabeled utterances given a taxonomy of labels utilizing topic word semi-supervised learning.

20 Claims, 5 Drawing Sheets

(56) References Cited

U.S. PATENT DOCUMENTS

| | | | | |
|---|---|---|---|---|
| 8,954,327 | B2* | 2/2015 | Koshinaka | G10L 17/04 704/246 |
| 9,473,637 | B1* | 10/2016 | Venkatapathy | H04M 3/5175 |
| 2004/0088308 | A1* | 5/2004 | Bailey | G06F 16/355 |
| 2008/0313180 | A1* | 12/2008 | Zeng | G06F 16/36 |
| 2012/0078918 | A1* | 3/2012 | Somasundaran | G06F 17/278 707/748 |
| 2012/0290293 | A1* | 11/2012 | Hakkani-Tur | G06F 16/951 704/9 |
| 2013/0035929 | A1* | 2/2013 | Okamoto | G06Q 10/10 704/9 |
| 2014/0223296 | A1* | 8/2014 | Solmer | G06F 3/033 715/273 |
| 2014/0351178 | A1* | 11/2014 | Bogdanova | G06N 20/00 706/12 |
| 2015/0006151 | A1* | 1/2015 | Iwakura | G06F 17/2715 704/9 |
| 2016/0203209 | A1* | 7/2016 | Clinchant | G06N 20/00 707/738 |
| 2016/0253679 | A1* | 9/2016 | Venkatraman | G06Q 30/0185 705/310 |
| 2017/0075991 | A1* | 3/2017 | Kataria | G06F 16/358 |
| 2017/0169816 | A1* | 6/2017 | Blandin | G10L 15/26 |
| 2017/0185601 | A1* | 6/2017 | Qin | G06F 16/24578 |
| 2017/0228654 | A1* | 8/2017 | Skupin | G06F 17/211 |
| 2017/0270096 | A1* | 9/2017 | Sheafer | G06F 17/271 |
| 2018/0341632 | A1* | 11/2018 | Akkiraju | G06F 17/2785 |
| 2018/0367483 | A1* | 12/2018 | Rodriguez | H04L 51/046 |
| 2018/0367484 | A1* | 12/2018 | Rodriguez | G06Q 10/101 |
| 2019/0155947 | A1* | 5/2019 | Chu | G06N 20/00 |

OTHER PUBLICATIONS

Stolcke et al, "Dialogue act modeling for automatic tagging and recognition of conversational speech." Computational linguistics 26.3 (2000), pp. 339-373.

Ritter, Cherry, and Dolan, "Unsupervised modeling of twitter conversations." Human Language Technologies: The 2010 Annual Conference of the North American Chapter of the Association for Computational Linguistics. Association for Computational Linguistics, 2010, pp. 172-180.

Arguello and Shaffer, "Predicting Speech Acts in MOOC Forum Posts." Proceedings of the 9th international conference on web and social media (ICWSM). 2015, www.aaai.org.

* cited by examiner

500

510

| DIALOGUE ACT | TOPIC WORDS |
|---|---|
| GREETING | THANK HELLO REACH HEY TODAY |
| TECHNICAL TROUBLE SHOOTING | MODE SAFE DATABASE SYSTEM RESTORE |
| CONCLUDING CONVERSATION | LET KNOW NEED FURTHER ASSISTANCE |
| OFFERING ASSISTANCE | LOOK CONCERN HELP CLOSER TAKE |
| SOLICITING INFORMATION | ISSUE EXPERIENCE PROBLEM REPORT DETAIL |
| REFERRING TO SPECIFIC TEAM | CONTACT TEAM REGION SUPPORT ASSIST |
| PROVIDING LINK | LINK INFORM SEND SHARE FOLLOW |
| RESPONDING TO BILLING QUESTIONS | RETURN CARD REFUND CANCEL CHARGE |
| EMPHASIZING/ACKNOWLEDGING | FEEL GOOD WANT SURE RIGHT |
| HANDLING DELIVERS | ORDER ARRIVE TDELAY PACKAGE ESTIMATED |
| APOLOGIZING | SORRY FRUSTRATION INCONVENIENCE TROUBLE APOLOGIZE |
| REQUESTING IDENTIFIERS/TAKING OFFLINE | NUMBER ACCOUNT NAME CALL EMAIL |

520

| DIALOGUE ACT | REPRESENTATIVE CANDIDATE SENTENCES |
|---|---|
| OFFERING HELP | WE'LL SEE WHAT WENT WRONG |
| TECHNICAL TROULE SHOOTING | WE'RE WORKING HARD TO GET YOU ON YOUR WAY TO CALIFORNIA THIS MORNING |
| COMFORTING | HAVE YOU SUBMITTED THE LOST ITEM REPORT? |
| SOLICITING INFORMATION | YOU CAN CLICK HERE FOR INFORMATION REGARDING IDENTIFICATION REQUIREMENTS |
| PROVIDING INFORMATION | WHAT'S THE FLIGHT NUMBER? |
| REQUESTING IDENTIFIERS/TAKING OFFLINE | SORRY TO HEAR YOU'RE UNCOMFORTABLE |
| EMPHATHIZING | FEEL GOOD WANT SURE RIGHT |

CONVERSATION UTTERANCE LABELING

BACKGROUND

The present invention relates to a computing environment, and more specifically to a computer program, method, and system for understanding and labeling an utterance.

SUMMARY

According to one embodiment of the invention, there is provided a method for simplifying and improving quality of labeling an utterance utilizing one or more topic words found in an utterance to determine dialog acts, the method implemented by a processor performing the steps of: receiving unlabeled utterances and receiving a taxonomy of labels. Applying an automated algorithm to cluster the unlabeled utterances according to one or more topic words to form an unlabeled cluster. Mapping the one or more topic words to an entry in the taxonomy of labels and labeling an unlabeled utterance utilizing semi-supervised learning utterance and wherein the label represents a dialog act.

According to one embodiment of the invention, there is provided a computing program product executing instructions having the steps of the method for labeling an utterance.

According to one embodiment of the invention, there is provided an information handling system including at least one processor executing instructions implementing steps of the method for labeling an utterance.

BRIEF DESCRIPTION OF THE DRAWINGS

The above-mentioned features of the present invention may be better understood, and its numerous objects, features, and advantages made apparent to those skilled in the art by taken in conjunction with the accompanying drawings wherein like reference numerals denote like elements and in which:

FIG. 5 depicts examples of mappings between dialog acts and topic words and also mappings between dialog acts and representative candidate sentences.

DETAILED DESCRIPTION

Figure 1:
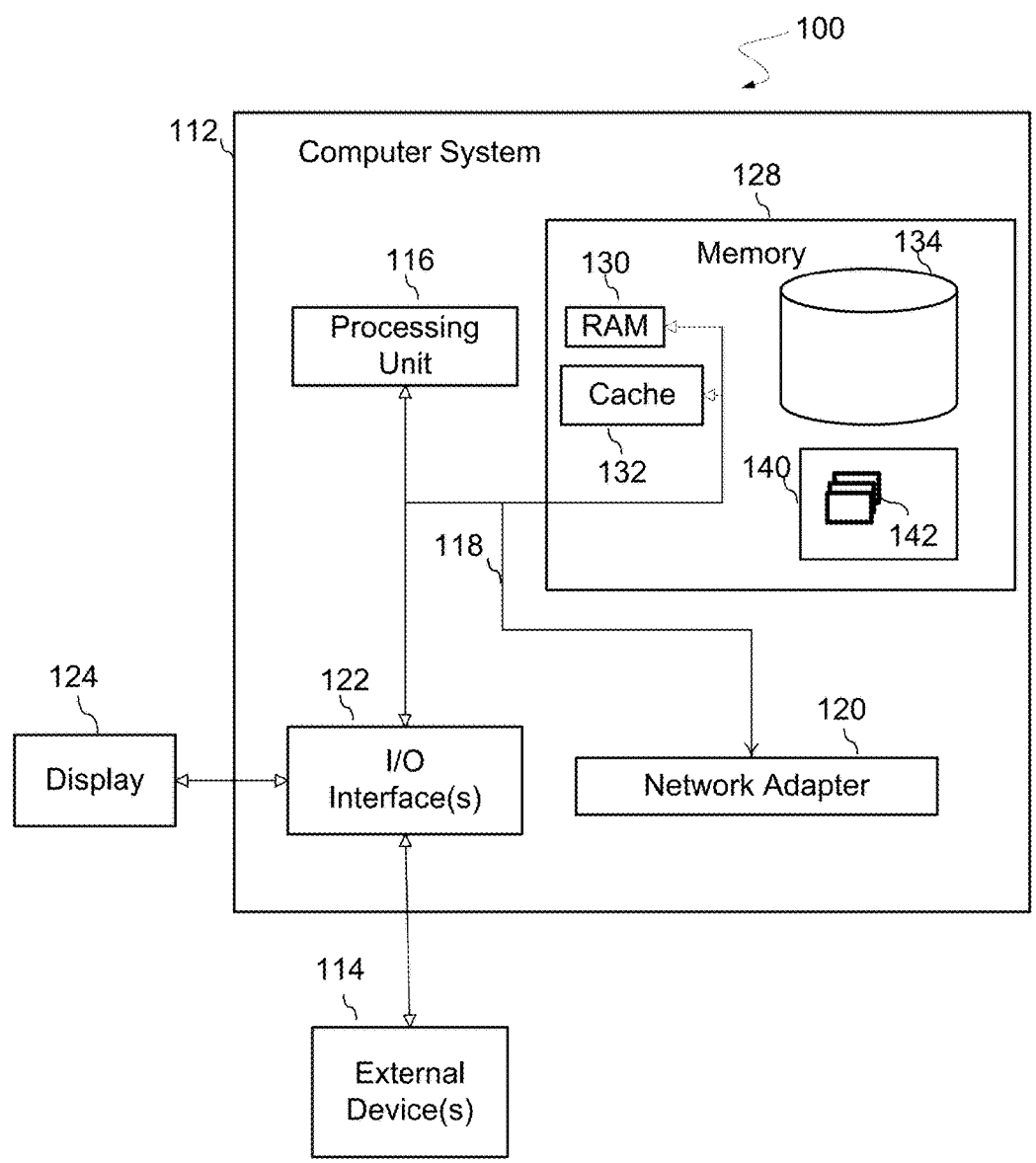
FIG. 1 depicts a computer system 100 according to an embodiment of the present invention and is a block diagram example of a data processing system in which the methods described herein can be implemented.

Embodiments of the invention are described below with reference to drawings in detail.

Often, people recognize a need to find information to complete a task, an assignment, or answer a question. Many people have devices that they use to search for the information needed to complete the task. A user of the device will typically use a browser or a search engine to find the information. If the user is not successful, then the user may try getting help to receive the information. While attempting to receive help the user may contact a product support center. The product support center may have a voice response system to assist the user. Finding out what type of support the customer wants is an example of a usage of the invention described herein. Various technologies are used to automate the process in order to allow the system to receive and respond to customer queries. The support may be called a dialog application. The development of a successful dialog application is a time-consuming process and requires a significant amount of manual labor because of the nature of the tasks being performed. One of the tasks performed in the development of a dialog application is the generation of annotations or providing labels for raw speech data. The raw speech data, called "an utterance" can be complete sentences. An utterance may contain a subject conveying a statement, question, exclamation, or command. In addition, an utterance may have a main clause and sometimes one or more subordinate clauses. Currently dialog applications attempt to classify complete utterances. This may be performed by people, performing a "labeling task." Various guides may be developed to assist with the classification task or the "labeling of an utterance." However, currently there is no attempt to apply word classifications or word taxonomy to label utterances.

In view of the deficiencies in prior art, various method, system, and computer program product embodiments of the invention are provided herein. This invention takes advantage of a class of terms or words that identify topics or dialog acts. Those words that identify topics or dialog acts are called "key words" or "topic words." An existing taxonomy is taken as an input and an algorithm is used to ensure generated labels are suitable for a specific purpose, such as, for example, intent detection and conversation modeling, called "utterance labeling." In addition, some embodiments may also provide a representative utterance or sentence based on an utterance label. Embodiments of the invention may have various usages. In an embodiment, annotators label utterances at a topic word level instead of an utterance level and output labels at an individual utterance level. This approach can greatly simplify the labeling task and reduce the labor intensity. In other words, the invention disclosed herein can improve the quality and reduce the cost of utterance labeling. One example usage is for assisting in the process of construction of ground truth mappings for systems utilizing machine learning or artificial intelligence.

Referring to FIG. 1, a schematic of a processing system 100 is shown wherein the methods of this invention may be implemented. The processing system 100 is only one example of a suitable system and is not intended to suggest any limitation as to the scope of use or functionality of embodiments of the invention described herein. Regardless, the system 100 is capable of implementing and/or performing any of the functionality set forth herein. In the system 100 there is a computer system 112, which is operational with numerous other general purpose or special purpose computing system environments or configurations. Examples of well-known computing systems, environments, and/or configurations that may be suitable for use with the computer system 112 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 112 may be described in the general context of computer system-executable instructions, such as program modules, being executed by a computer system.

Generally, program modules may include routines, programs, objects, components, logic, data structures, and so on that perform particular tasks or implement particular abstract data types. The computer system 112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 112 in the system environment 100 is shown in the form of a general-purpose computing device. The components of the computer system 112 may include, but are not limited to, a set of one or more processors or processing units 116, a system memory 128, and a bus 118 that couples various system components including the system memory 128 to the processor 116.

The bus 118 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA) bus, the Micro Channel Architecture (MCA) bus, the Enhanced ISA (EISA) bus, the Video Electronics Standards Association (VESA) local bus, and the Peripheral Component Interconnects (PCI) bus.

The computer system 112 typically includes a variety of computer system readable media. Such media may be any available media that is accessible by the computer system 112, and it includes both volatile and non-volatile media, removable and non-removable media.

The system memory 128 can include computer system readable media in the form of volatile memory, such as random access memory (RAM) 130 and/or a cache memory 132. The computer system 112 may further include other removable/non-removable, volatile/non-volatile computer system storage media. By way of example only, a storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 118 by one or more data media interfaces. As will be further depicted and described below, the system memory 128 may include at least one program product having a set (e.g., at least one) of program modules 142 that are configured to carry out the functions of embodiments of the invention.

A program/utility 140, having the set (at least one) of program modules 142, may be stored in the system memory 128 by way of example, and not limitation, as well as an operating system, one or more application programs, other program modules, and program data. Each of the operating systems may have one or more application programs, other program modules, and program data or some combination thereof, and may include an implementation of a networking environment. The program modules 142 generally carry out the functions and/or methodologies of embodiments of the invention as described herein.

The computer system 112 may also communicate with a set of one or more external devices 114 such as a keyboard, a pointing device, a display 124, a tablet, a digital pen, etc. wherein these one or more devices enable a user to interact with the computer system 112; and/or any devices (e.g., network card, modem, etc.) that enable the computer system 112 to communicate with one or more other computing devices. Such communication can occur via Input/Output (I/O) interfaces 122. These include wireless devices and other devices that may be connected to the computer system 112, such as, a USB port, which may be used by a tablet device (not shown). Still yet, the computer system 112 can communicate with one or more networks such as a local area network (LAN), a general wide area network (WAN), and/or a public network (e.g., the Internet) via a network adapter 120. As depicted, a network adapter 120 communicates with the other components of the computer system 112 via the bus 118. It should be understood that although not shown, other hardware and/or software components could be used in conjunction with the computer system 112. Examples include, but are not limited to: microcode, device drivers, redundant processing units, external disk drive arrays, RAID systems, tape drives, and data archival storage systems, etc.

Figure 2:
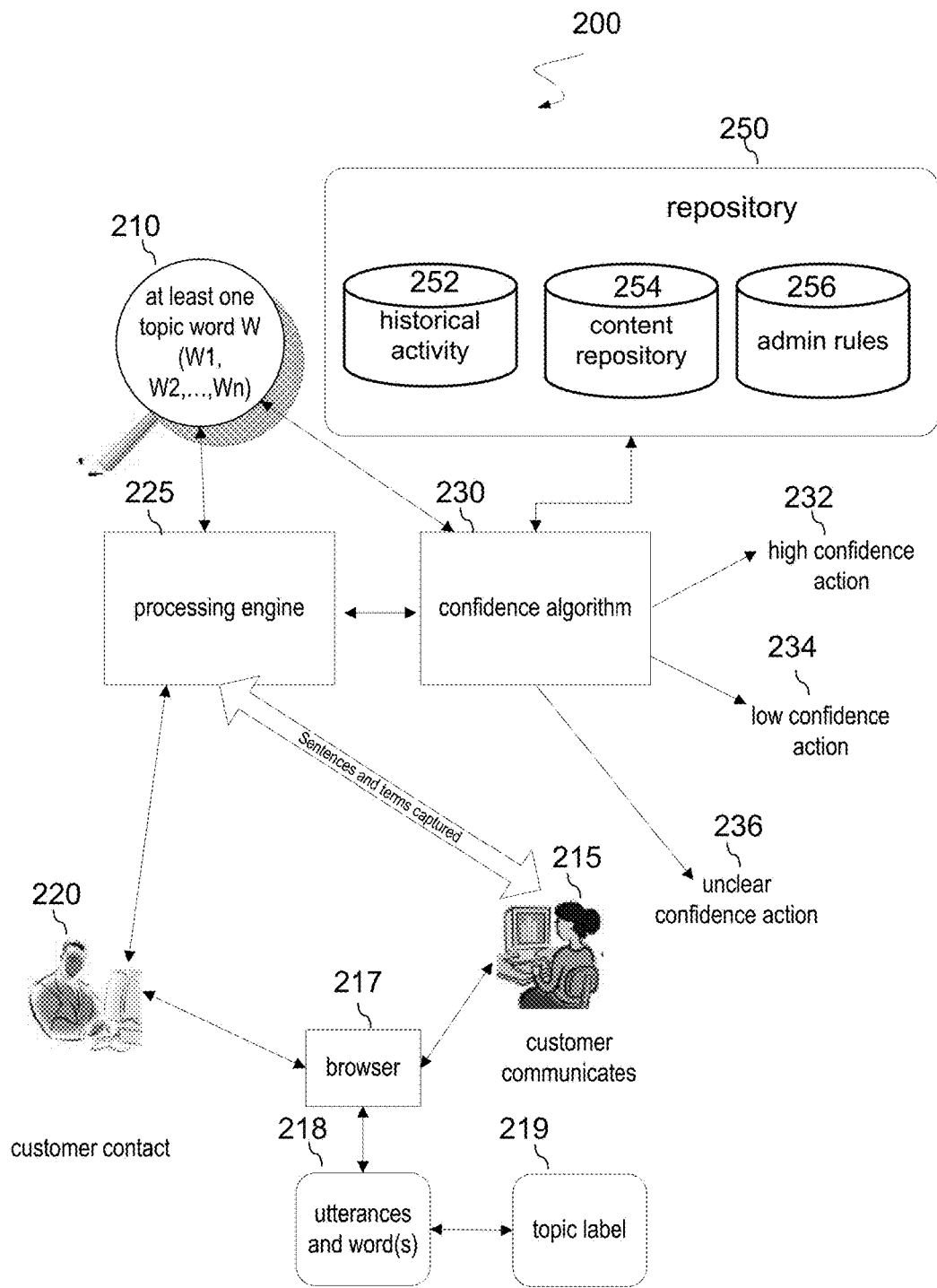
FIG. 2 depicts a functional set of components and a flow of control for labeling unlabeled utterance or sentences from labeled terms (words).

FIG. 2 depicts a functional set of components and a flow for achieving an embodiment of aspects of the invention, more specifically, for classifying unlabeled utterance or sentences from labeled terms (words).

An aspect of the invention is described in an example scenario. The user is a customer 215 that bought a product. The product could be any product, for example, but not limited to, a leaf blower, a vacuum, an image editor, and etc. The customer 215 is trying to find out why the product is not working properly or how to get it to perform some type of operation. The customer 215 brings up a search engine using a browser 217. The customer 215 tries different words and word combinations while searching for the answer to the question. The browser 217 returns URLs using its internal search algorithm. The customer 215 may select a customer support web site provided by the product provider, returned by the browser 217. After, a period of time the customer 215 uses browser 217 by accessing the product's web site and an on-line help support [not shown] interface which contacts some type of product support, hereafter called customer contact 220. Other methods for contact might be used, for example, but not limited to, phone, email, short message service (SMS), texting, posting a message, and etc. The customer contact 220 could be an actual person or even a voice response system with an artificial intelligence (AI) capability.

The customer contact 220 communicates with customer 215 and by interactive communication, obtains clarification of why the customer 215 is communicating with customer contact 220. The reason for the contact could be to obtain information, get an error corrected, receive an apology, make an order, make a payment, and etc. In an embodiment, the customer 215 uses one or more sentences to communicate the desired information. Each sentence is referred to as an utterance. Each utterance includes keywords and phrases. The keywords and phrases may be sufficient to obtain a reason for the contact. The process of determining the reason for the communication is called utterance labeling. Once an utterance is labeled, the course of the communication by the customer contact 220 follows a recommended path based on the utterance label. If the labeling is correct, then the communication is likely to follow a path that meets the needs of the customer 215. If the labeling is not correct, then there is a significant chance that the customer will be frustrated.

In order to label the utterances correctly, a history of customer contact is collected. In some embodiments, the history, the sentences, and the keywords are captured in a database. The disposition could be made during the communication. In another embodiment, it could be after the customer verifies the information actually resolves the problem via a customer survey. While the customer 215 communicates with customer contact 220 various information is collected. The information may be as simple as topic words the customer 215 used with the customer contact 220 to describe the problem initially or it could be as complex as retrieving information about the effort the customer 215 used to find the information via searching using browser 217, posting comments on a forum, social media queries, and the like. The information, may be, for example, derived from interactions via instant messages between customer 215 and customer contact 220.

The customer contact 220 contains a processing engine 225 that receives the collected information and identifies at least one topic word 210 that the customer 215 tried to use to find the information. The processing engine 225 utilizes confidence algorithm 230 which interfaces with repository 250. The repository 250 may have various elements. The elements may include, but are not limited to, for example, historical activity 252 that captured other search terms used in the past for similar content stored in content repository 254, and admin rules 256 that are followed when interfacing with repository 250. The confidence algorithm 230 associates at least one topic word 210 from the utterances with the topic label 219 and characterizes the at least one topic word 210 with the topic label 219. The confidence algorithm 230 attempts to evaluate if the topic label 219 should be revised to reflect a predicted improvement in labeling. Consideration may include historical activity 252 that includes terms customers have used in the past while requiring the specific service or dialog act. The similar content and a characterization of the similar content may be in content repository 254 that may include other features being searched. The confidence algorithm 230 utilizes the at least one topic word 210 and topic label 219 characterization to predict a confidence level of adjusting of the topic label 219 based on changing the at least one topic word 210 associated with the topic label 219. The change may be an addition of one topic word, a change of a second topic word, an addition of a third topic word, a deletion of a fourth topic word, and etc.

The confidence algorithm 230 may apply various admin rules 256 based on different optimization rules. The rules could be by target customer group, a specific product, a product type, an industry product type, or any other tasks, factors, triggers, and the like. Using the admin rules 256, the confidence algorithm 230 may utilize some type of statistical assessment to predict if a change to the topic label 219 should be made. When the confidence algorithm 230 determines that a missing keyword has a high probability of improving topic label 219, the confidence algorithm performs a high confidence action 232, such as, for example, but not limited to, adding additional information to content repository 254 under a predicted improvement to labeling category, updating or changing content in topic label 219, making a recommendation to change the topic label 219, and the like. Those keywords that improve topic label 219 are called topic words and are referenced as at least one topic word 210. However, if the confidence algorithm 230 determines that adding a missing keyword has a low probability of improving topic label 219, the confidence algorithm 230 performs a low confidence action 234, such as, for example, but not limited to, making a determination of not adding a missing topic word to the at least one topic word keyword 210 associated with the topic label 219. Alternatively, the missing keyword may be added to the content repository 254 under a not predicted to improve labeling category, a revise product documentation category, and the like. If the confidence algorithm 230 determines that a missing keyword has an unclear probability of improving topic label 219, the confidence algorithm 230 performs an unclear confidence action 236, such as, for example, but not limited to, recording related information in historical activity 252. The confidence algorithm 230 may have an Artificial Intelligence (AI) component that learns which terms are relevant and utilizes a feedback loop adding new evaluations and new results to determine which terms are relevant. The feedback loop would have expected advantages, such as, speeding up processing time, improving customer satisfaction and increasing the quality of the keywords in the topic label 219 to improve its discoverability to customers. Having an existing keyword mapping to a label and a synonym of the existing keyword used in a similar utterance would be an example where a high confidence action 232 would be taken.

The method of identifying representative topic words to labels may be implemented in a computer system 112 including I/O interface(s) 112 that capture user interfaces.

Figure 3:
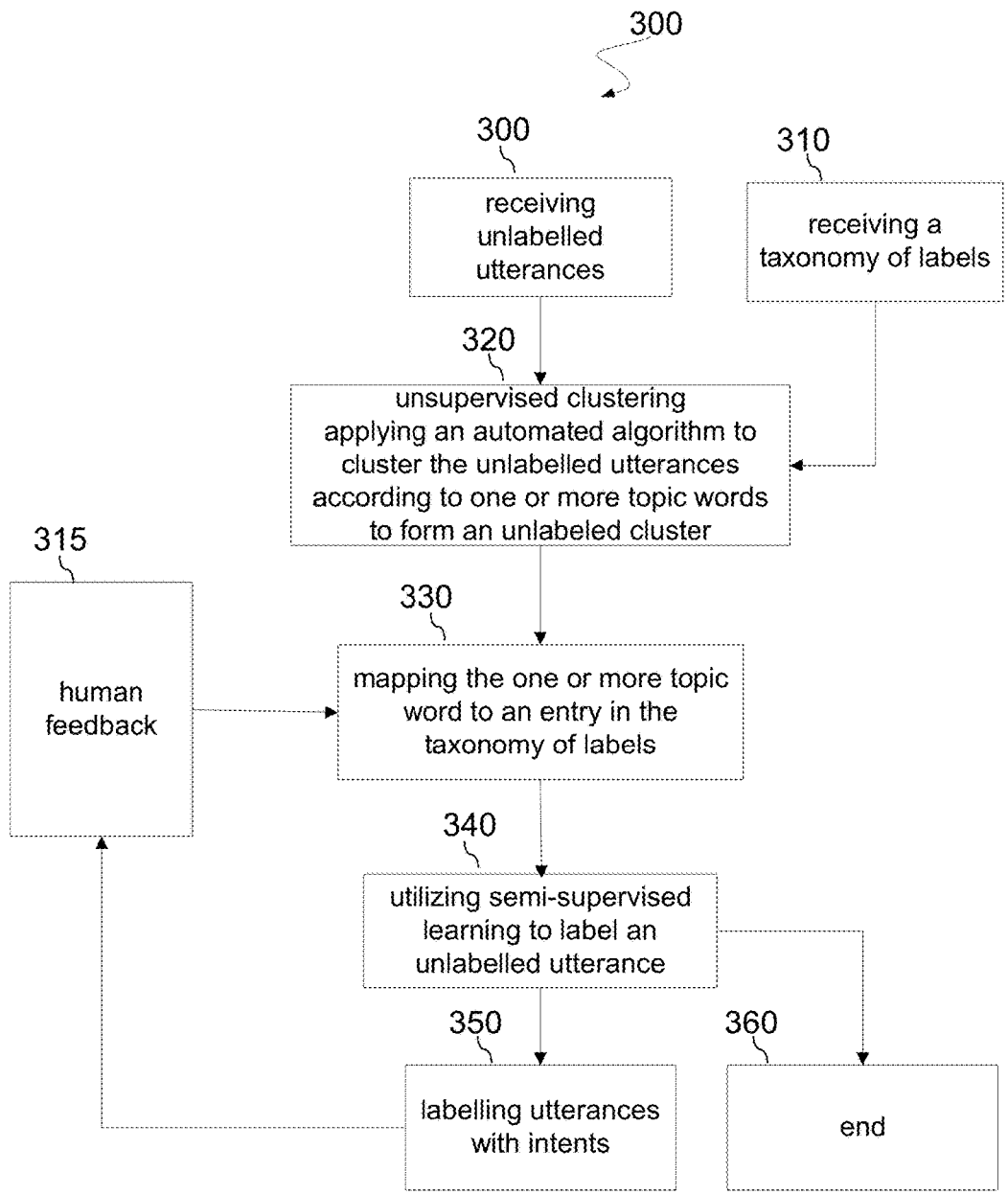
FIG. 3 depicts an example embodiment of the invention herein.

FIG. 3 depicts a more detailed flow of an example embodiment depicting an aspect of the invention described herein. The process begins at step 300 where unlabeled utterances 300 are received. This could be from where a customer 215 has contacted customer contact 220 with a request for support. The customer contact 220 could be via any communication technique. In the example embodiment of FIG. 2, the user utilizes browser 217 to contact customer contact 220. The communication between customer contact 220 and the customer 215 could be, for example and without limitation, one or more of the following: verbal, text, text selections, short message service (SMS), instant message, interactive voice response, numeric keyboard, browser 217 GUI elements, forums, social media, texting, smart phone application, and the like. The customer contact 220 may even be a voice response system service that itself uses artificial intelligence (AI) to communicate with customer 215. The process proceeds to perform unsupervised clustering 320, where an automated algorithm is applied to cluster the unlabeled utterances according to one or more topic words to form an unlabeled cluster. Also at step 320, a taxonomy of labels 310 is received. The algorithm utilizes a statistical analysis to form clusters for the unlabeled utterances based on a similarity of the terms found in the taxonomy of labels 310. In an embodiment, unsupervised clustering is used to form the clusters using techniques, such as, a topic modeling method, a Latent Dirichlet allocation (LDA), a variational bayesian, or a statistical probability. The taxonomy of labels 310 may be supplied by human annotators or be received from a content repository 254 based on virtually any source. Additional sequential methods such as hidden markov models (HMMs) can also be applied to consider the sequential order of topics in a conversation and update the clustering results. The process proceeds to step 330 where the one or more topic words is mapped to an entry in the taxonomy of labels using semantic analysis.

At step 330, the mapping may be based on matching topic words to entries in the taxonomy of labels. Alternatively, the mapping may be based on matching between the taxonomy of labels and unlabeled utterances. The input includes both the label taxonomy and the outputs of unsupervised learning. A semantic matching engine may be used to compute the similarity between topics word in utterances and labels in the taxonomy. Topic word level matching may be computed using, for example, the word2vec similarity between a topic word and a predefined label. If the similarity value is above a certain threshold, the label will be assigned to the topic word. A label can be associated with multiple topic words. The process then proceeds to step 340 where semi-supervised learning is used to label an unlabeled utterance.

With the invention disclosed herein, once topic words are labeled, there is no need to analyze utterances for further annotation. That is, the mapping of the terms to labels allows utterances with the terms to be directly labeled. That is, once a term is used to label an utterance, the process may proceed to step 360 to end. A semi-supervised algorithm may be used. This step preforms clustering on utterances with constraints generated from semantic matching 330. In this step, the constraints are integrated from both topic-word level and utterance level, and then semi-supervised clustering may be performed according to the constraints. For example, a customized seeded LDA can be designed to take both labeled topic words and utterances used as seeds for clustering. After the updated clustering results are obtained from semi-supervised clustering 340, human annotation and semantic matching 330 can be further applied to generate additional seeds (constraints) and perform semi-supervised clustering 340. Also, annotators may be asked to annotate whether a topic word is relevant for a given label. As a result, a list of topic words are identified as associated with the label. These topic words will be used as seeded words (e.g. additional clustering constraints) in semi-supervised clustering 340. Moreover, once a topic word is labeled, corresponding utterances can be directly labeled. In some embodiments, the corresponding utterances may be extracted for further annotation. A similar procedure can be applied to utterance level matching. For example, annotators can directly assign labels to representative utterances based on key words found in the utterance. The process proceeds to labeling utterances with intents 350. The terms in an utterance are associated semantically with a taxonomy of labels 310 and the terms associated with the cluster utilizes the taxonomy to identify a label for the terms. Also, at step 350 a representative utterance may be chosen to represent the label.

In an embodiment, the process proceeds to step 315 where human feedback 315 is used to validate the mapping. The process can be repeated until annotators reach a certain degree of agreement.

The label is a classification that may indicate, for example, and without limitation, a billing question, directions to perform steps, part replacement information, not supported disclaimer, or any content that helps answer or resolve the question posed by the customer 215. The identification label for the utterances 350 may be provided to the customer 215 via any of the communication technologies. It could be, for example, a description of steps to follow to land on the topic label 219 by utilizing the browser 217. The repository 250 may be a database management system (DBMS) supporting indexing, queries, and other typical database features. It could be any data store for recording and retrieving data. The repository 250 may include various elements, for example, but not limited to, historical activity 252 that records a history of interactions by different users by various methods, a content repository 254, that identifies, for example, product features and associates the product features with web pages, user browser activity when reaching web pages, and admin rules 250 that may determine policies for capturing information, rules for changing Web pages, and the like. The repository 250 may have default rules for tracking of topic words and associating topic words with web pages. The repository 250 may be adaptive and may automatically adjust based on feedback via artificial intelligence (AI) technology. Although the user interface depicted in FIG. 2 is browser 217, any user interface may be used. The user interface may provide a GUI where the user inputs parameters as menu entries, command line entries, scripts entries, configuration files, .xml files, or any other means of providing the required information.

In some embodiments, the system may derive the required information from a history of accesses kept by the browser 217. The browser 217 or the search engine used by the customer 216 may provide Application Programming Interfaces (APIs) such as a representational state transfer (REST) to support retrieving the browser 217 search history. As the system may keep track of information extracted from the search history to identify at least one topic word 210 and determine an initial confidence associated with the identified at least one topic word 210 based on patterns of access and queries. During step 306, the processing engine 225 uses confidence algorithm 230 to access the repository 250 and to characterize the at least one topic word 210. The characterization identifies at least one topic word 210 to form an at least one topic label 219 characterization.

The human feedback 315 may be tied to a confidence algorithm 230 that formulates queries against the repository 250 to determine how the at least one topic word 210 have been used by others. The historical activity 252 may be retrieved as well as the information from the content repository 254 to find associations between the usages and products. Natural language processing (NLP) may be applied to the historical activity 252, to the at least one topic word 210, and the content repository 254 to categorize each of the at least one topic word 210 and associate them with the topic label 219. Deep analytic analysis and artificial intelligence technologies may be used to adjust the categorization. Feedback from Subject Matter Experts (SMEs), product representatives, and other user feedback may be used to tune the characterization and form a confidence level or ranking that the at least one topic word 210 affect the labeling 219 of the topic label 219. In most cases, adding any keyword from the at least one topic word 210 to the topic label 219 is unlikely to change the topic label 219. However, adding some terms may have unwanted side effects. For example, some keywords may not relate to the specific product or cause an undesirable association. Some embodiments may have different processes related to at least one topic word 210 based on different criteria. The actions that follow depend on the confidence level and the admin rules 256.

The illustrative embodiment is based on a predicted improvement of the labeling 219 for utterances based on the confidence algorithm 230. Once the human feedback in step 315 is completed, the process continues to step 330. If the confidence is high that adding at least one topic word 210 a clustering of keywords improves the labeling for the clustered utterances, then the process continues to step 340.

Figure 4:
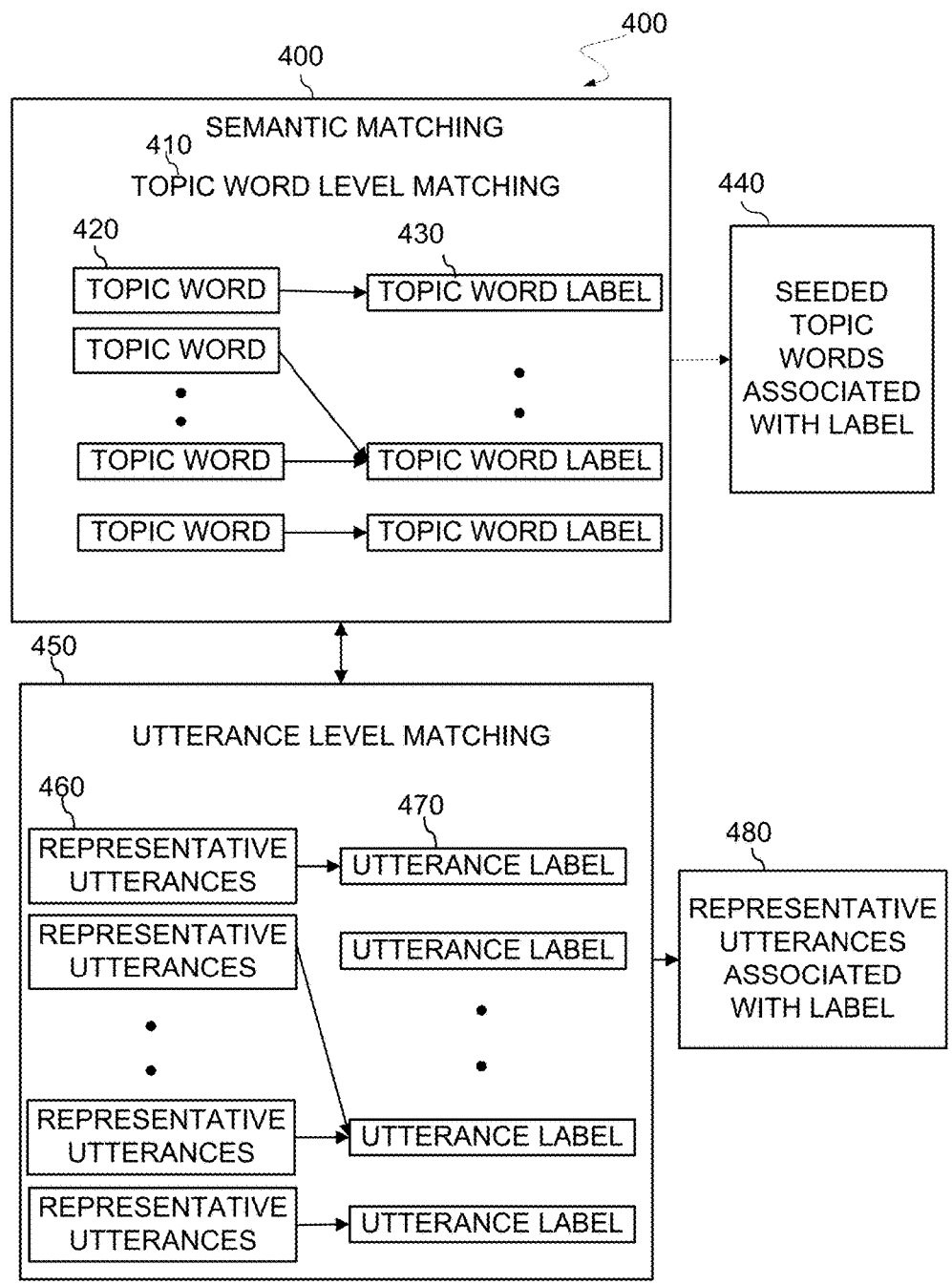
FIG. 4 depicts more details for an example embodiment of the invention herein.

FIG. 4 depicts more details of Semantic matching 400 used in an example of steps performed in FIG. 3. In an example embodiment, matching is done at two separate levels. Topic word level matching 410 takes sets of topic words W (W1, W2, . . . , Wn) and utilizes semantic analysis to associated topic words 420 with a topic label 430. For each set of topic words Wk (Wk, Wk+1, . . . , Wk+m) there is associated a topic word label WLk. These are seeded topic words associated with labels. Utterance level matching 450 takes a set of representative utterances U (U1, U2, . . . , Up) 460 and applies an algorithm to assign an utterance label 470. For each set of utterance labels ULk there is associated an utterance label ULk (ULk, ULk+1, . . . , ULk+n). In an example embodiment, the word2vec similarity between a topic word and the intent label is used to assign mappings.

FIG. 5 depicts some examples of mapping shown in FIG. 4. Examples of mapping between Dialog Acts and keywords are shown as entries in table 510. Examples of mappings between Dialog acts and Representative keyword sentences are shown in table 520.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for simplifying and improving quality of labeling an utterance utilizing one or more topic words found in an utterance to determine dialog acts, the method implemented by a processor comprising:
   receiving unlabeled utterances;
   receiving a taxonomy of labels;
   applying an automated algorithm to cluster the unlabeled utterances according to the one or more topic words to form an unlabeled cluster;
   mapping the one or more topic words to an entry in the taxonomy of labels; and
   utilizing semi-supervised learning to label an unlabeled utterance and wherein the label represents a dialog act.

2. The method of claim 1, wherein the automated algorithm is selected from a group consisting of a topic modeling, a latent dirichlet allocation, a variational bayesian, and a statistical probability.

3. The method of claim 1, wherein mapping the one or more topic words to the entry in the taxonomy of labels is determined by supervised training.

4. The method of claim 3, further comprising:
   identifying a representative utterance containing the one or more topic words.

5. The method of claim 4, further comprising:
   utilizing a confidence algorithm to associate the one or more topic word to the unlabeled cluster and the entry in the taxonomy of labels to form an assessment; and
   labeling unlabeled utterances in the unlabeled cluster based on the assessment meeting a high confidence criteria.

6. The method of claim 5, further comprising:
   utilizing the mapping of the one or more topic words to the unlabeled utterance as a ground truth entry in a customer support system.

7. The method of claim 6, wherein the customer support system routes calls based on the labeling.

8. A computer program product for simplifying and improving quality of labeling an utterance utilizing one or more topic words found in an utterance to determine dialog acts, the computer program product comprising a computer readable storage medium having program instructions embodied therewith, the program instructions executable on a processing circuit to cause the processing circuit to perform the method comprising:
   receiving unlabeled utterances;
   receiving a taxonomy of labels;
   applying an automated algorithm to cluster the unlabeled utterances according to the one or more topic words to form an unlabeled cluster;
   mapping the one or more topic words to an entry in the taxonomy of labels; and
   utilizing semi-supervised learning to label an unlabeled utterance and wherein the label represents a dialog act.

9. The computer program product of claim 8, wherein the automated algorithm is selected from a group consisting of a topic modeling, a latent dirichlet allocation, a variational bayesian, and a statistical probability.

10. The computer program product of claim 8, wherein mapping the one or more topic words to the entry in the taxonomy of labels is determined by supervised training.

11. The computer program product of claim 10, further comprising:
    identifying a representative utterance containing the one or more topic words.

12. The computer program product of claim 11, further comprising:
    utilizing a confidence algorithm to associate the one or more topic words to the unlabeled cluster and the entry in the taxonomy of labels to form an assessment; and
    labeling an unlabeled utterances in the unlabeled cluster based on the assessment meeting a high confidence criteria.

13. The computer program product of claim 12, further comprising:
    utilizing the mapping of the one or more topic words to labels as a ground truth entry in a customer support system.

14. The computer program product of claim 13, wherein the customer support system routes calls based on the labeling.

15. An information handling system for simplifying and improving quality of labeling an utterance utilizing one or more topic words found in an utterance to determine dialog acts, the information handling system comprising:
    at least one processor;
    a memory coupled to the at least one processor;
    a set of instructions stored in the memory and executed by the at least one processor wherein the set of instructions perform operations including:
    receiving unlabeled utterances;
    receiving a taxonomy of labels;
    applying an automated algorithm to cluster the unlabeled utterances according to the one or more topic words to form an unlabeled cluster;
    mapping the one or more topic words to an entry in the taxonomy of labels; and utilizing semi-supervised learning to label an unlabeled utterance and wherein the label represents a dialog act.

16. The information handling system of claim 15, wherein the automated algorithm is selected from a group consisting of a topic modeling, a latent dirichlet allocation, a variational bayesian, and a statistical probability.

17. The information handling system of claim 15, wherein mapping the one or more topic words to the entry in the taxonomy of labels is determined by supervised training.

18. The information handling system of claim 17, further comprising:
    identifying a representative utterance containing the one or more topic words.

19. The information handling system of claim 18, further comprising:
    utilizing a confidence algorithm to associate the one or more topic words to the unlabeled cluster and the entry in the taxonomy of labels to form an assessment; and
    labeling unlabeled utterances in the unlabeled cluster based on the assessment meeting a high confidence criteria.

20. The information handling system of claim 19, further comprising:
    utilizing the mapping of the one or more topic words to labels as a ground truth entry in a customer support system.

* * * * *